United States Patent Office 3,306,912
Patented Feb. 28, 1967

3,306,912
SULFOLANYL POLYAMINES AND METHOD FOR THEIR PRODUCTION
Henry E. Fritz, Charleston, W. Va., and Robert P. Yunick, Schenectady, N.Y., assignors to Union Carbide Corporation, a corporation of New York
No Drawing. Filed Sept. 14, 1964, Ser. No. 396,405
19 Claims. (Cl. 260—332.1)

This invention relates to a novel class of polyamines and to a method for their production. More particularly, this invention relates to a class of water soluble polyamines containing the tetrahydrothiophene-1,1-dioxide-3,4-diyl group and to a method for their production.

The polyamines of this invention are produced by reacting, in a basic medium, an alkylene polyamine, as hereinafter defined, with a 3,4-dihalotetrahydrothiophene-1,1-dioxide, as hereinafter defined. The resulting polymeric product is predominantly a linear polymer of the general formula:

(I) 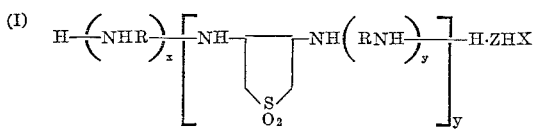

wherein R, X and x are as hereinafter defined; y is a positive integer; and Z is an integer having a value of from 0 up to 2y.

The alkylene polyamine employed in producing the polymers of this invention is represented by the formula:

(II) $H(NHR)_xNH_2$ wherein x is an integer having a value of from 1 to 10, preferably from 3 to 10; and R is a divalent saturated aliphatic radical of from 2 to 10, preferably from 2 to 3, carbon atoms whose valence bonds are from different carbons. As examples of suitable alkylene polyamines one can mention ethylene diamine, hexamethylene diamine, decamethylene diamine, diethylene triamine, triethylene tetramine, tetraethylene pentamine, and the like. The 3,4-dihalotetrahydrothiophene-1,1-dioxides employed in producing the polymers of this invention are those represented by the formula:

(III) 

wherein X is a halogen, preferably one having an atomic number of from 17 to 35, and most preferably chlorine. Examples include 3,4-dichlorotetrahydrothiophene-1,1-dioxide, 3,4-dibromotetrahydrothiophene-1,1-dioxide, and the like.

The reaction is effected by contacting the alkylene polyamine and the dihalotetrahydrothiophene-1,1-dioxide in a basic medium. The molar ratio of alkylene polyamine to dihalotetrahydrothiophene-1,1-dioxide is not highly critical, and can vary from about 0.1:1 or lower up to 5:1 or higher. A molar ratio of at least 1:1 is preferred.

The reaction medium can be any suitable inert diluent or solvent for the polymer product. Solvents or diluents containing reactive substituents (i.e., those having active hydrogen as determined by the Zerewittenoff method) such as primary or secondary amine groups, hydroxyl groups, mercapto groups and the like, should not be employed because of their tendency to compete with the alkylene polyamine in the reaction. Preferred are solvents for the polymer product, such as water and tetrahydrofuran, with water being particularly preferred. The amount of solvent or diluent employed is not highly critical, provided the reaction mixture is sufficiently fluid to permit agitation, as by stirring, to insure adequate contact of the reactants. In general, weight ratios of solvent to dihalotetrahydrothiophene-1,1-dioxide of from 1:1 to 6:1 or higher are generally sufficient.

As indicated above, the reaction is conducted in a basic reaction medium. A sufficiently basic medium is present when the alkylene polyamine is employed in a molar excess over the dihalotetrahydrothiophene - 1,1 - dioxide. However, the resulting product is a highly quaternized hydrohalide salt. When a less quaternized or unquaternized polymer is desired, an alkali metal hydroxide is also employed in the reaction to tie up the halogen from the dihalotetrahydrothiophene-1,1-dioxide in the form of its alkali metal salt. The amount of alkali metal hydroxide is not highly critical, but amounts in excess of greater than 2.5 moles per mole of dihalotetrahydrothiophene-1,1-dioxide are generally unnecessary even to obtain the unquaternarized polymer. Molar ratios of at least 2:1, and particularly from 2.1:1 to 2.5:1, are preferably employed.

The reaction can be carried out in any suitable manner and the reactants generally can be added in any desired order. When an alkali metal hydroxide is employed, however, it is preferred that the hydroxide and the dihalotetrahydrothiophene-1,1-dioxide are not contacted unless in the presence of the alkylene polpamine. The alkali metal hydroxide acts as a dehydrohalogenation agent for the dihalotetrahydrothiophene-1,1-dioxide to form an intermediate which, unless it is able to react with the alkylene polyamine, will condense with itself to form polymeric materials, thereby reducing the yield and efficiency of the reaction. Thus, when an alkali metal hydroxide is employed, it is preferred to either (a) add the dihalotetrahydrothiophene-1,1-dioxide to a mixture of the alkali metal hydroxide and alkylene polyamine or (b) add alkali metal hydroxide and alkylene polyamine to dihalotetrahydrothiophene-1,1-dioxide. In the latter technique, it is preferred that the amine and hydroxide be added separately, at rates sufficient to maintain a molar excess of amine over hydroxide.

The rate of addition is not highly critical, provided that the equipment employed has sufficient heat capacity to remove the exothermic heat of reaction and hold the reaction temperature below about 100° C. The reaction temperature can be as low as room temperature (20–25° C.) or lower, although temperatures of from about 40° C. to about 70° C. are preferably employed.

The reaction is extremely rapid, and, for a batch reaction, is essentially complete when all the reactants have been added. However, an additional heating period of up to 6 hours or more can be employed, if desired.

The resulting reaction mixture comprises the polymer of this invention, the reaction solvent, and, if an alkali metal hydroxide is employed, an alkali metal halide. The polymer is readily recovered by evaporation of the reaction solvent. The alkali metal halide is readily removed by methods known to the art, such as by dissolving the polymer in a solvent in which the halide is insoluble, for example, methanol.

As indicated above, the polymer of this invention is essentially a linear polymer as represented by Formula I. However, in certain instances, the polymer may contain units of the formula:

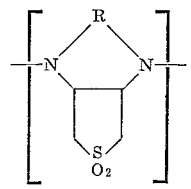

Formation of units of this type is particularly likely to occur when polyalkylene polyamines, i.e., alkylene polyamines of Formula II, above, wherein $x$ is at least 2 are employed, and wherein the valence bonds from the alkylene groups are from adjacent carbon atoms.

The polymers of this invention, when isolated from the reaction mixture, are very viscous liquids, and can have reduced viscosities of from 0.005 to 0.5, preferably from 0.01 to 0.1, as determined from a 0.2 weight percent solution in water at room temperature.

The polymers of this invention find particular utility as additives for imparting wet strength to paper. They can be employed, either after isolation from the reaction mixture or without purification, by reaction with halohydrins or epihalohydrins to form a resin by known techniques, such as those disclosed in U.S. Patent No. 2,595,935, which in then applied to the paper.

The following examples are illustrative.

*Example 1*

A nitrogen-purged reaction flask was charged with 200 milliliters of water and 47.3 grams (0.25 mole) of 3,4-dichlorotetrahydrothiophene-1,1-dioxide and heated to 38° C. With the heat removed, 43.9 grams (0.30 mole) of triethylenetetramine was added dropwise at 38–48° C. over a 90-minute period and the resulting mixture was held at 65° C. for 4 hours. Water was stripped from the mixture under a nitrogen-purged vacuum at 35° C. or below, leaving 90 grams of an exceedingly viscous, amber-colored polymer representing a yield of 98.8%.

*Analysis.*—Calculated for a mixture of 0.25 mole of dichlorotetrahydrothiophene dioxide and 0.3 mole of triethylenetetramine: Cl, 19.38; Cl⁻, 19.38; N, 18.45; S, 8.83. Found: Cl, 17.63; Cl⁻, 18.14; N, 16.41; S, 8.32, 8.68. Note: Cl⁻ stands for chlorine as the chloride ion.

*Example 2*

A stirred suspension of 12.4 grams (0.30 mole) of 97% sodium hydroxide pellets and 43.8 grams (0.30 mole) of triethylenetetramine in a nitrogen-purged flask was cooled to below room temperature and 3,4-dichlorotetrahydrothiophene-1,1-dioxide was added. After only a small portion of the dichlorotetrahydrothiophene dioxide was added, the reaction mixture became too viscous to stir and 200 milliliters of water were added. Thereafter a total of 45.0 grams (0.238 mole) of dichlorotetrahydrothiophene dioxide was added at room temperature and the resulting solution was heated at 65° C. for 5 hours. After cooling to room temperature, the solution was extracted 6 times with 50-milliliter portions of chloroform. The aqueous raffinate was stripped of water under a nitrogen-purged vacuum at 40° C. or below to give a sludge which was slurried in methanol and filtered to remove undissolved sodium chloride. The methanol was vacuum stripped from the filtrate and the process was repeated 2 more times to increase the removal of salt. The recovered salt amounted to 14.1 grams, 80.3% of theoretical, based on the 0.30 mole of sodium hydroxide charged. The product was a pale-colored, viscous polymer which weighed 75.4 grams representing a 95.7% yield.

*Analysis.*—Calculated for a mixture of 0.30 mole of triethylenetetramine and 0.238 mole of dichlorotetrahydrothiophene dioxide from which 0.30 equivalent of chloride has been removed; Cl, 7.04; Cl⁻, 7.04; N, 21.8; S, 9.87. Found: Cl, 8.21; Cl⁻, 8.15; N, 16.36; S, 8.38, 8.58.

*Example 3*

To a stirred suspension of 47.3 grams (0.25 mole) of 3,4-dichlorotetrahydrothiophene-1,1-dioxide in 100 milliliters of water maintained at about 50° C. were added dropwise and simultaneously over 20 minutes 43.9 grams (0.30 mole) of triethylenetetramine and a solution of 22.7 grams (0.55 mole) of 97% sodium hydroxide in 50 milliliters of water. After maintaining the resulting solution at 65° C. for 5 hours, 6 milliliters of concentrated hydrochloric acid was added to neutralize the excess sodium hydroxide. The resulting solution was worked up as described in Example 2 to give 28.0 grams (87.0% based on 0.55 mole of sodium hydroxide) of sodium chloride and 66 grams of polymer product.

*Analysis.*—Calculated for a mixture of 0.30 mole of triethylenetetramine and 0.25 mole of dichlorotetrahydrothiophene dioxide from which all chlorine has been removed as sodium chloride; Cl, 0.00; Cl⁻, 0.00; N, 22.9; S, 11.15. Found: Cl, 3.03; Cl⁻, 2.64; N, 19.34; S, 10.26, 10.35.

*Example 4*

Employing apparatus and procedures similar to those described in Example 3, 76.0 grams (0.402 mole) of 3,4-dichlorotetrahydrothiophene-1,1-dioxide in 175 milliliters of water, 58.8 grams (0.402 mole) of triethylenetetramine and 3.65 grams (0.88 mole) of 97% sodium hydroxide in 80 milliliters of water were admixed at 40–50° C. over a half-hour period and then heated at 65° C. for 5 hours. Eight grams of concentrated hydrochloric acid were added and the mixture was worked up as described in Example 2 to give 38.5 grams of sodium chloride and 111 grams of polymer product.

*Analysis.*—Calculated: Cl, 0.00; Cl⁻, 0.00; N, 21.20; S, 12.47. Found: Cl, 5.61; Cl⁻, 2.76; N, 17.15; S, 10.23, 10.32.

*Example 5*

Employing apparatus and procedures similar to those described in Example 3, a stirred, nitrogen-covered slurry of 47.3 grams (0.25 mole) of 3,4-dichlorotetrahydrothiophene-1,1-dioxide in 100 milliliters of water was admixed with 43.9 grams (0.3 mole) of triethylenetetramine and a solution of 22.7 grams (0.55 mole) of 97% sodium hydroxide in 50 milliliters of water. Most of the addition was accomplished at 35–50° C. over about 20 minutes. The stirred solution was cooled over 45 minutes to 30° C., treated with 6 milliliters of concentrated hydrochloric acid and charcoal, and then filtered to give 286 grams of an aqueous solution containing 72.9 grams of polymer product and 32.5 grams of salt.

*Example 6*

To a stirred solution of 43.9 grams (0.3 mole) of triethylenetetramine and 54.4 grams (1.32 moles) of 97% sodium hydroxide in 200 milliliters of water were added 113 grams (0.60 mole) of 3,4-dichlorotetrahydrothiophene-1,1-dioxide. The reaction mixture was heated at 63–65° C. for 5 hours, cooled to room temperature and treated with 6 milliliters of concentrated hydrochloric acid and charcoal. The aqueous solution was stripped of water under vacuum, and filtered of salt to give 119 grams of viscous polymer product and 57 grams of salt.

*Example 7*

Employing apparatus and procedures similar to those described in Example 3, 45.0 grams (0.238 mole) of 3,4-dichlorotetrahydrothiophene-1,1-dioxide in 100 milliliters of water, 21.6 grams (0.524 mole) of 97% sodium hydroxide in 15 milliliters of water, and 54.1 grams (0.286 mole) of tetraethylenepentamine were admixed over 10 minutes at 50° C. and the reaction mixture was held at 50–60° C. for 0.75 hour. Six milliliters of concentrated hydrochloric acid were added to neutralize excess base and the solution was worked up as described in Example 2 to give 24 grams of sodium chloride and 71 grams of polymer product.

*Analysis.*—Calculated: Cl, 0.00; Cl⁻, 0.00; N, 24.50; S, 9.38. Found: Cl, 2.74; Cl⁻, 1.61; N, 20.03; S, 8.89, 9.04.

*Example 8*

A slurry of 45 grams (0.238 mole) of 3,4-dichlorotetrahydrothiophene-1,1-dioxide in 150 milliliters of water was added over a 42-minute period to a stirred mixture of 21.6 grams (0.524 mole) of 97% sodium hydroxide, 54.1 grams (0.286 mole) of tetraethylenepentamine and 100 milliliters of water maintained at 30 to 46° C. The reaction mixture was cooled to room temperature and treated with 6 milliliters of concentrated hydrochloric acid and charcoal. After filtration, the solution weighed 500 grams and contained 81.7 grams of polymer product and 30.7 grams of salt.

*Example 9*

A slurry of 135 grams (0.714 mole) of 3,4-dichloro-tetrahydrothiophene - 1,1 - dioxide and 200 milliliters of water was added over a 27-minute period to a stirred mixture of 54.1 grams (0.286 mole) of tetraethylenepentamine, 64 grams (1.55 moles) of 97% sodium hydroxide and 200 milliliters of water at 35–50° C. The reaction mixture was cooled to room temperature and treated with 12 milliliters of concentrated hydrochloric acid and charcoal. After filtration, the solution weighed 784 grams and contained 137.1 grams of polymer product and 90.7 grams of salt.

*Example 10*

To a stirred mixture of 91.0 grams (0.48 mole) of tetraethylenepentamine, 36.3 grams (0.88 mole of sodium hydroxide and 1,000 milliliters of tetrahydrofuran were added 75.7 grams (0.4 mole) of 3,4-dichlorotetrahydrothiophene-1,1-dioxide over 42 minutes at 26–50° C. The reaction mixture was then heated at 50–58° C. for 3.2 hours, cooled to room temperature and neutralized with 6.5 milliliters of concentrated hydrochloric acid. After evaporation of tetrahydrofuran, there were recovered 81 grams of a viscous polymer product (A). Oil which remained on the sides of the flask was taken up in methanol, filtered to remove solids and concentrated by evaporation of methanol to recover 51 grams of a very viscous polymer product (B). Polymer B was much more viscous than polymer A and probably had a higher average molecular weight.

*Example 11*

Employing apparatus and procedures similar to those described in Example 3, 94.6 grams (0.5 mole) of 3,4-dichlorotetrahydrothiophene - 1,1 - dioxide, a solution of 45.4 grams (1.1 moles) of sodium hydroxide in 100 milliliters of water and a solution of 37.1 grams (0.5 mole) of 1,3-diaminopropane in 300 milliliters of water were admixed over 16 minutes at below 48° C. The resulting mixture was then heated at 61–65° C. for 5.2 hours, cooled to room temperature and neutralized by the addition of 10 grams of concentrated hydrochloric acid. On evaporation of the water, there were recovered 54.7 grams of sodium chloride and 108 grams of viscous brown oil. The oil was taken up in methanol, and the methanol solution, after separation from a very viscous insoluble fraction, was stripped to remove methanol, leaving 60 grams of a less viscous polymer product.

*Example 12*

To a stirred solution of 22.7 grams (0.55 mole) of 97% sodium hydroxide, 34.0 grams (0.3 mole) of diethylenetriamine and 200 milliliters of water were added 47.3 grams (0.25 mole) of 3,4-dichlorotetrahydrothiophene-1,1-dioxide over 14 minutes at 30–50° C. The resulting solution was heated at 65–67° C. for 5 hours, cooled to room temperature and treated with 5 grams of concentrated hydrochloric acid and charcoal. The filtered solution weighed 379 grams and contained 31.6 grams of salt and 63.1 grams of polymer product.

The polymers produced as described in the foregoing examples were all tested as wet strength agents by dissolving the polymer in water or diluting the aqueous polymer product, adding epichlorohydrin and heating. The resulting product was then diluted with water to 3 percent solids, and paper was immersed in the resin solution, dried and cured. The cured paper was then evaluated in accordance with the following tests.

(1) Tensile strength—The force in kilograms required to break a sample, either wet or dry, having a 15 mm. width.

(2) Percent dry strength—The ratio of the difference in tensile strength of treated and untreated sample divided by the tensile strength of the untreated sample and multiplied by 100.

(3) Percent wet strength—The ratio of the wet tensile strength to the dry tensile strength of a treated sample multiplied by 100.

The proportions of ingredients, conditions and results of these tests are summarized in tabular form below. The paper employed had a basis weight in the range of 44.7 to 48.1 pounds, per ream of 500 25″ x 38″ sheets, as determined by weighing and measuring the area of a sample sheet.

| Example | REACTION WITH EPICHLOROHYDRIN | | | | PAPER EVALUATION | | | |
|---|---|---|---|---|---|---|---|---|
| | Polymer Concentration in Aqueous Solution | Epichlorohydrin,[1] Ratio | Temp., ° C. | Time, hr. | Dry Tensile | Wet Tensile | Percent Dry Strength | Percent Wet Strength |
| 1 | 33 | 2 | 85 | 2.5 | 7.0 | 1.61 | 11 | 23 |
| 2 | 33 | 2 | 85 | 2.5 | 6.8 | 1.58 | 10 | 23 |
| 3 | 33 | 2 | 85 | 2.5 | 6.9 | 1.81 | 11 | 27 |
| 4 | 33 | 2 | 85 | 2.5 | 6.4 | 1.35 | 3 | 21 |
| 5 | 16 | 2 | 85 | 1 | 7.1 | 1.84 | 15 | 26 |
| | 16 | 2 | 60 | 2.25 | 6.2 | 1.61 | 11 | 26 |
| 6 | 16 | 2 | 85 | 1 | 6.5 | 6.74 | 5 | 11 |
| 7 | 33 | 2 | 85 | 2.5 | 7.5 | 2.11 | 14 | 28 |
| | 16 | 3 | 60 | 2.25 | 6.2 | 1.40 | 11 | 23 |
| 8 | 16 | 3 | 85 | 1 | 6.7 | 1.59 | 8 | 24 |
| | 16 | 3 | 60 | 2.25 | 6.6 | 1.73 | 18 | 26 |
| 9 | 16 | 1 | 85 | 1 | 6.2 | 0.61 | 0 | 10 |
| 10-A | 33 | 1 | 85 | 2.5 | ---- | ---- | 0 | 30 |
| 10-B | 33 | 1 | 85 | 2.5 | ---- | ---- | 10 | 26 |
| 11 | 33 | 2 | 85 | 2.5 | ---- | ---- | 3 | 15 |
| 12 | 16 | 1 | 85 | 1 | 6.9 | 1.30 | 11 | 19 |

[1] Ratio of moles of epichlorohydrin to secondary amine groups in the polymer.

What is claimed is:

1. The process for producing a polyamine which comprises contacting in a basic medium a 3,4-dihalotetrahydrothiophene-1,1-dioxide with an alkylene polyamine of the formula $H(NHR)_xNH_2$, wherein x is an integer having a value of from 1 to 10 and R is a divalent saturated aliphatic radical of from 2 to 10 carbons whose valence bonds are from different carbon atoms, at a temperature of from room temperature to 100° C. for a period of time sufficient to form said polymer.

2. The process for producing a polyamine which comprises contacting in a basic medium a 3,4-dihalotetrahydrothiophene-1,1-dioxide whose halogen atoms have an atomic number of from 17 to 35, with an alkylene polyamine of the formula H(NHR)$_x$NH$_2$, wherein $x$ is an integer having a value of from 1 to 10 and R is a divalent saturated aliphatic radical of from 2 to 10 carbons whose valence bonds are from different carbon atoms, at a temperature of from room temperature to 100° C. for a period of time sufficient to form said polymer.

3. The process for producing a polyamine which comprises contacting in a basic medium a 3,4-dichlorotetrahydrothiophene-1,1-dioxide with an alkylene polyamine of the formula H(NHR)$_x$NH$_2$, wherein $x$ is an integer having a value of from 1 to 10 and R is a divalent saturated aliphatic radical of from 2 to 10 carbons whose valence bonds are from different carbon atoms, at a temperature of from room temperature to 100° C. for a period of time sufficient to form said polymer.

4. The process as claimed in claim 1 wherein said process is conducted in an inert solvent for said polymer.

5. The process as claimed in claim 1 wherein said process is conducted in water as a reaction solvent.

6. The process as claimed in claim 2 wherein said process is conducted in an inert solvent for said polymer.

7. The process as claimed in claim 2 wherein said process is conducted in water as a reaction solvent.

8. The process as claimed in claim 3 wherein said process is conducted in an inert solvent for said polymer.

9. The process as claimed in claim 3 wherein said process is conducted in water as a reaction solvent.

10. The process as claimed in claim 1 wherein R is —CH$_2$CH$_2$— and $x$ is an integer having a value of from 2 to 10.

11. The process as claimed in claim 2 wherein R is —CH$_2$CH$_2$— and $x$ is an integer having a value of from 2 to 10.

12. The process as claimed in claim 3 wherein R is —CH$_2$CH$_2$— and $x$ is an integer having a value of from 2 to 10.

13. The process for producing a polyamine which comprises contacting in an aqueous medium 3,4-dichlorotetrahydrothiophene-1,1-dioxide, an alkali metal hydroxide and an alkylene polyamine of the formula H(NHR)$_x$NH$_2$, wherein $x$ is an integer having a value of from 1 to 10 and R is a divalent saturated aliphatic radical of from 2 to 10 carbon atoms, at a temperature of from about room temperature to about 100° C. for a period of time sufficient to produce said polymer.

14. The process as claimed in claim 13 wherein R is —CH$_2$CH$_2$— and $x$ has a value of from 2 to 10.

15. The process as claimed in claim 13 wherein said alkylene polyamine is triethylenetetramine.

16. The process as claimed in claim 13 wherein said alkylene polyamine is tetraethylenepentamine.

17. The process as claimed in claim 13 wherein said alkylene polyamine is pentamethylenehexamine.

18. Polyamine of the formula:

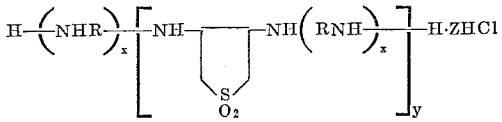

wherein R is a divalent saturated aliphatic radical of from 2 to 10 carbons whose valence bonds are from different carbons; $x$ is an integer having a value of from 1 to 10; $y$ is a positive integer and Z is an integer having a value of from 0 to 2$y$; said polymer having a reduced viscosity of from 0.005 to 0.5 as determined at room temperature from a 0.2 weight percent solution of said polymer in water.

19. The polyamines as claimed in claim 18 wherein R is —CH$_2$CH$_2$— and $x$ has a value of from 2 to 10.

No references cited.

WALTER A. MODANCE, *Primary Examiner.*

JAMES A. PATTEN, *Assistant Examiner.*